(12) United States Patent
Kobayashi (10) Patent No.: US 11,079,005 B2
(45) Date of Patent: Aug. 3, 2021

(54) VEHICULAR FINAL SPEED REDUCING DEVICE

(71) Applicant: TOYOTA JIDOSHA KABUSHIKI KAISHA, Toyota (JP)

(72) Inventor: Takahide Kobayashi, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 355 days.

(21) Appl. No.: 16/381,050

(22) Filed: Apr. 11, 2019

(65) Prior Publication Data

US 2019/0316670 A1   Oct. 17, 2019

(30) Foreign Application Priority Data

Apr. 11, 2018 (JP) .............................. JP2018-076440

(51) Int. Cl.
| | |
|---|---|
| F16H 57/027 | (2012.01) |
| F16H 57/04 | (2010.01) |
| F16H 57/038 | (2012.01) |
| F16H 48/19 | (2012.01) |

(52) U.S. Cl.
CPC ........... *F16H 57/027* (2013.01); *F16H 48/19* (2013.01); *F16H 57/038* (2013.01); *F16H 57/0457* (2013.01)

(58) Field of Classification Search
CPC .. F16H 57/027; F16H 57/038; F16H 57/0457; F16H 57/04; F16H 2057/02052; F16H 57/0483; F16H 57/0423; F16H 57/0424; B60K 17/344; B60K 23/08
See application file for complete search history.

(56) References Cited

U.S. PATENT DOCUMENTS

| 7,374,507 B2 * | 5/2008 | Corless ............... F16H 57/0483 184/6.12 |
| 7,866,231 B2 * | 1/2011 | Kincaid ............... F16H 57/037 74/607 |
| 9,057,431 B2 * | 6/2015 | Okada ................. F16H 57/0483 |

FOREIGN PATENT DOCUMENTS

| DE | 195 33 140 C1 | 5/1996 | |
| DE | 100 16 640 C1 | 9/2001 | |
| JP | 2000065191 A * | 3/2000 | ........... F16H 57/027 |
| JP | 2007-64425 A | 3/2007 | |
| JP | 2014-119084 A | 6/2014 | |
| JP | 2016-156434 A | 9/2016 | |
| JP | 2018-13142 A | 1/2018 | |

* cited by examiner

*Primary Examiner* — Thomas C Diaz
(74) *Attorney, Agent, or Firm* — Oliff PLC (57) ABSTRACT

In a vehicular final speed reducing device, the intermediate, rear, bottom and the side walls define a breather chamber, and the partition wall divides the breather chamber into auxiliary and primary breather chambers. The auxiliary breather chamber is held in communication with a space outside the breather chamber and within the housing, through a first hole formed through the intermediate wall, and through an opening formed between the intermediate and bottom walls. The primary breather chamber is held in communication with an outside atmosphere outside the housing, and with the auxiliary breather chamber through a second hole formed through the partition wall. The bottom wall extends from the rear wall such that a front end of the bottom wall is located forwardly of the opening in the axial direction of the ring gear.

8 Claims, 5 Drawing Sheets

VEHICULAR FINAL SPEED REDUCING DEVICE

This application claims priority from Japanese Patent Application No. 2018-076440 filed on Apr. 11, 2018, the disclosure of which is herein incorporated by reference in its entirety.

FIELD OF THE INVENTION

The present invention relates in general to a vehicular final speed reducing device, and more particularly to a vehicular final speed reducing device which includes a housing storing an oil and a breather, and which is configured to restrict a flow of the oil from an interior space of the housing.

BACKGROUND OF THE INVENTION

There is known a final speed reducing device for a vehicle having a drive power source, rear right and left wheels, and a pair of rear-wheel axles respectively connected to the rear right and left wheels. The final speed reducing device comprises: a housing having a bottom portion storing an oil; a drive pinion shaft which has a drive pinion gear and which is rotatably supported by the housing such that a vehicle drive force is transmitted to the drive pinion shaft from the drive power source; and a ring gear which is rotatably disposed within an interior space of the housing and which is held in meshing engagement with the drive pinion gear, so that the vehicle drive force transmitted to the drive pinion shaft is distributed to the pair of rear-wheel axles through the drive pinion gear and the ring gear.

JP2016-156434A discloses an example of such a vehicular final speed reducing device in the form of a differential gear device having a housing, and a breather chamber which is formed in an upper portion of the housing and which has a maze arrangement to restrict a flow of an oil from the breather chamber into an outside atmosphere after the oil splashed up by the ring gear and a differential casing is once accommodated in the breather chamber.

SUMMARY OF THE INVENTION

By the way, it is difficult to form the breather chamber having the maze arrangement in the upper portion of the housing, where a space in an upper part of the differential gear device (final speed reducing device) is limited due to structural restrictions of installation of the differential gear device on the vehicle.

The present invention was made in view of the background art described above. It is therefore an object of the present invention to provide a vehicular final speed reducing device which has a breather chamber and which is configured to effectively restrict a flow of an oil from the breather chamber, without a complicated arrangement of the breather chamber.

The object indicated above is achieved according to the following modes of the present invention:

According to a first mode of the invention, there is provided a final speed reducing device for a vehicle including a drive power source, rear right and left wheels, and a pair of rear-wheel axles respectively connected to the rear right and left wheels, the final speed reducing device comprising: a housing having a bottom portion storing an oil; a drive pinion shaft which includes a drive pinion gear and which is rotatably supported by the housing such that a vehicle drive force is transmitted to the drive pinion shaft from the drive power source; and a ring gear which is rotatably disposed within an interior space of the housing and which is held in meshing engagement with the drive pinion gear, so that the vehicle drive force transmitted to the drive pinion shaft is distributed to the pair of rear-wheel axles through the drive pinion gear and the ring gear, wherein the housing includes an intermediate wall dividing the interior space of the housing into front and rear parts, a rear wall located in a rear part of the housing, a bottom wall extending from the rear wall to a position below the intermediate wall, a pair of side walls opposed to each other and connected to the intermediate, rear and bottom walls, and a partition wall, the intermediate wall, the rear wall, the bottom wall, and the pair of side walls defining a breather chamber, the partition wall dividing the breather chamber into an auxiliary breather chamber positioned rearwards of an axis of the ring gear in a longitudinal direction of the vehicle, and a primary breather chamber positioned upwards of the auxiliary breather chamber, the auxiliary breather chamber being held in communication at an upper portion thereof with an outside space formed outside the breather chamber and within the housing, through a first hole formed through the intermediate wall, and through an opening formed between the intermediate wall and the bottom wall, the primary breather chamber being held in communication with an outside atmosphere outside the housing, and with the auxiliary breather chamber through a second hole formed through the partition wall, the bottom wall extending from the rear wall such that a front end of the bottom wall is located forwardly of the opening in the longitudinal direction of the vehicle.

According to a second mode of the invention, the final speed reducing device according to the first mode of the invention is configured such that the first hole is formed at a position spaced apart from a position of the second hole formed through the partition wall, by a predetermined distance in an axial direction of the rear-wheel axles.

According to a third mode of the invention, the final speed reducing device according to the first or second mode of the invention is configured such that the first hole is located above a level of the oil stored in the bottom portion of the housing while the ring gear is held at rest, and the opening is kept within a bath of the oil while the ring gear is held at rest.

According to a fourth mode of the invention, the final speed reducing device according to any one of the first, second and third modes of the invention is configured such that the intermediate wall, the rear wall, the bottom wall, one of the pair of side walls, and the partition wall are formed integrally with the housing.

In the final speed reducing device according to the first mode of the invention, the air within the housing is allowed to flow into the primary breather chamber through the auxiliary breather chamber. Although the air within the housing may flow into the auxiliary breather chamber together with the oil, the air and the oil are separated from each other within the auxiliary breather chamber. Further, the bottom wall reduces a risk of flow of the oil splashed up by the rotating ring gear, into the auxiliary breather chamber through the opening. Thus, the final speed reducing device is configured to reduce a risk of flow of the oil into the primary breather chamber and a risk of leakage of the oil from the housing into the outside atmosphere.

According to the second mode of the invention, the first hole is formed at the position spaced apart from the position of the second hole formed through the partition wall, by the predetermined distance in the direction of the axis of the rear-wheel axles. Accordingly, the air which contains the oil and which has flown into the auxiliary breather chamber from the first hole can be separated from the oil until the air reaches the second hole, making it possible to reduce the risk of flow of the oil into the primary breather chamber and the risk of leakage of the oil from the housing into the outside atmosphere.

According to the third mode of the invention, the opening is formed at the position below the level of the oil while the ring gear is held at rest. Accordingly, the outside space formed outside the breather chamber and within the housing is not in communication with the auxiliary breather chamber through the opening. On the other hand, the first hole is located above the level of the oil while the ring gear is held at rest, so that the outside space and the auxiliary breather chamber are held in communication with each other through the first hole. Accordingly, the air can be discharged from the housing into the outside atmosphere, even while the ring gear is held at rest.

Further, the opening is formed at the position lower than the level of the oil while the ring gear is held at rest. Accordingly, the primary breather chamber has a relatively long distance to the opening. The level of the oil while the ring gear is rotated is lowered with respect to the level while the ring gear is held at rest, so that the air containing the oil flows into the auxiliary breather chamber through the opening during rotation of the ring gear. Since the primary breather chamber is relatively distant from the opening, however, the air can be separated from the oil within the auxiliary breather chamber, whereby the risk of flow of the oil into the primary breather chamber can be reduced.

According to the fourth mode of the invention, the intermediate wall, the rear wall, the bottom wall, the side wall and the partition wall are formed integrally with the housing, so that a rear-wheel drive force distributing unit can be produced in a smaller number of process steps.

DETAILED DESCRIPTION OF PREFERRED EMBODIMENT

A preferred embodiment of this invention will be described in detail by reference to the drawings. It is to be understood that the drawings are simplified and transformed as needed, and do not necessarily accurately represent the dimensions and shapes of various elements of the embodiment.

Embodiment

Figure 1:
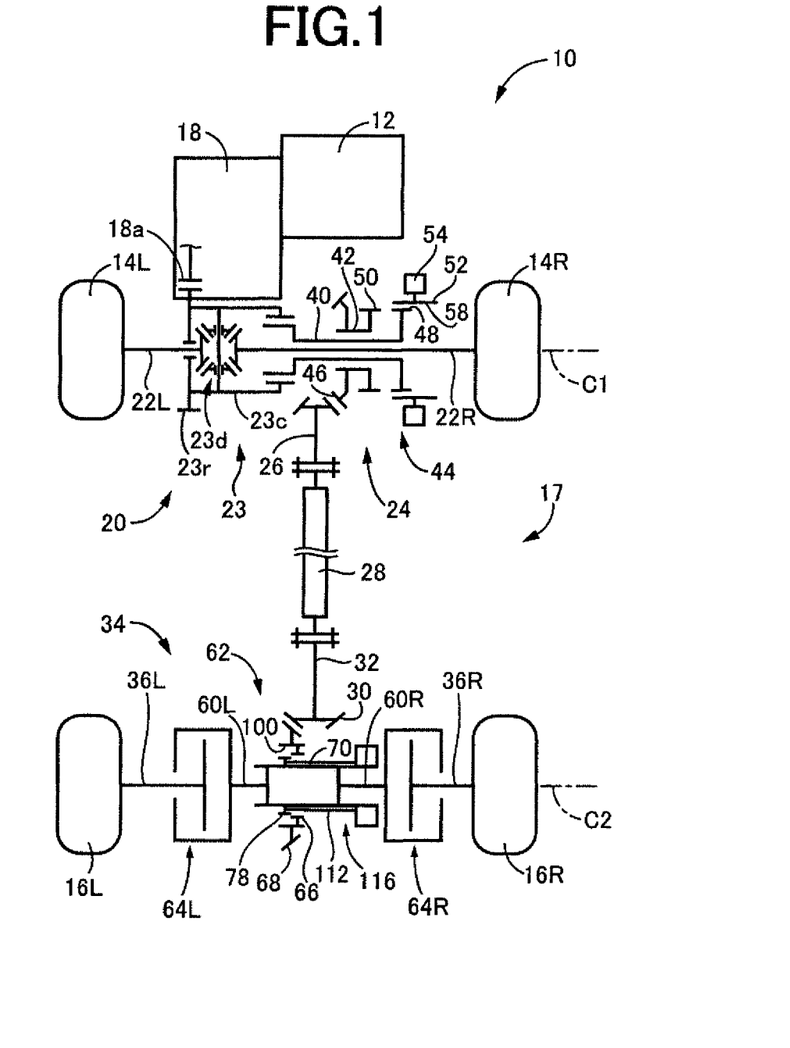
FIG. 1 is a schematic view showing an arrangement of a four-wheel-drive vehicle according to one embodiment of this invention.

Reference is first made to FIG. 1, which is the schematic view showing an arrangement of a 4-wheel-drive vehicle 10 having a final speed reducing device in the form of a rear-wheel drive force distributing unit 34 configured according to one embodiment of this invention. As shown in FIG. 1, the 4-wheel-drive vehicle 10 is provided with a 4-wheel-drive power transmitting system 17 (hereinafter referred to as "power transmitting system 17") which is basically of an F—F type including: a drive power source in the form of an engine 12; a first power transmitting path through which a drive force of the engine 12 is transmitted to main drive wheels in the form of left and right front wheels 14L and 14R (hereinafter referred to as "front wheels 14", unless otherwise specified); and a second power transmitting path through which the drive force of the engine 12 is transmitted to auxiliary drive wheels in the form of left and right rear wheels 16L and 16R (hereinafter referred to as "rear wheels 16", unless otherwise specified). The power transmitting system 17 is configured to transmit the drive force of the engine 12 to the front wheels 14, and to transmit a portion of the drive force of the engine 12 to the rear wheels 16 through a propeller shaft 28.

The power transmitting system 17 includes: an automatic transmission 18; a front-wheel drive force distributing unit 20 configured to distribute the drive force of the engine 12 to the left and right front wheels 14L and 14R; and the above-indicated rear-wheel drive force distributing unit 34 configured to distribute the drive force from the propeller shaft 28 to the left and right rear wheels 16L and 16R. When the power transmitting system 17 is placed in a 2-wheel-drive state, the drive force of the engine 12 is transmitted through the first power transmitting path, namely, through the automatic transmission 18, the front-wheel drive force distributing unit 20 and left and right front-wheel axles 22L and 22R (hereinafter referred to as "front-wheel axles 22", unless otherwise specified), to the left and right front wheels 14L and 14R. In the 2-wheel-drive state, the drive force of the engine 12 is not transmitted through the second power transmitting path, namely, not transmitted to the propeller shaft 28 and the rear-wheel drive force distributing unit 34. When the power transmitting system 17 is placed in a 4-wheel-drive state, the drive force of the engine 12 is transmitted through not only the first power transmitting path but also the second power transmitting path, such that a portion of the drive force of the engine 12 is transmitted to the left and right rear wheels 16L and 16R through the propeller shaft 28 and the rear-wheel drive force distributing unit 34, as well as to the front wheels 14. It is noted that a torque converter or any other fluid-operated power transmitting device or a clutch, which is not shown in FIG. 1, is disposed between the engine 12 and the automatic transmission 18.

Examples of the automatic transmission 18 include: a step-variable automatic transmission which has a plurality of planetary gear sets and a plurality of frictional coupling devices (clutches and brakes) and which is shifted to a selected one of speed positions with selective engaging actions of the frictional coupling devices; a step-variable automatic transmission of a permanent-meshing parallel-axes type which is shifted to a selected one of speed positions with operations of a shift actuator and a select actuator; and a continuously variable transmission a speed ratio of which is continuously variable with controlled changes of effective diameters of a pair of variable-diameter pulleys connected to each other through a transmission belt, such that the effective diameters are variable. Since the automatic transmission 18 is known in the art, its construction and operation will not be further described in detail.

The front-wheel drive force distributing unit 20 includes a front-wheel differential mechanism 23 and a transfer 24 which are disposed rotatably about an axis C1 of the front-wheel axles 22. The front-wheel differential mechanism 23 is a well known differential gear device having a ring gear 23r meshing with an output gear 18a of the automatic transmission 18, a differential casing 23c rotating together with the ring gear 23r about the axis C1 of the front-wheel axles 22, and a differential mechanism 23d consisting of bevel gears accommodated within the differential casing 23c. When a drive force is transmitted from the output gear 18a of the automatic transmission 18 to the differential mechanism 23d through the ring gear 23r and the differential casing 23c, the drive force is transmitted to the left and right front-wheel axles 22L and 22R while a difference between rotating speeds of the axles 22R and 22L is permitted. The differential casing 23c is splined to an input rotary member 40 of the transfer 24, at its one axial end in the direction of the axis C1.

The transfer 24 includes the input rotary member 40 rotated with the differential casing 23c about the axis C1, an output rotary member 42 operatively connected to the propeller shaft 28, and a first positive clutch 44 configured to connect and disconnect the input rotary member 40 and the output rotary member 42 to and from each other. When the first positive clutch 44 is placed in a released state, the input rotary member 40 and the output rotary member 42 are disconnected from each other, so that the drive force of the engine 12 is not transmitted to the rear-wheel drive force distributing unit 34. Namely, the second power transmitting path is placed in a power cutoff state, in the released state of the first positive clutch 44. When the first positive clutch 44 is placed in an engaged state, on the other hand, the input rotary member 40 and the output rotary member 42 are connected to each other, so that a portion of the drive force of the engine 12 is distributed to the left and right rear wheels 16 through the propeller shaft 28 and the rear-wheel drive force distributing unit 34. That is, the second power transmitting path is placed in a power transmitting state, in the engaged state of the first positive clutch 44.

The input rotary member 40 is a cylindrical member disposed radially outwardly of the front-wheel axle 22R, and is rotatable about the axis C1 of the front-wheel axle 22R. The input rotary member 40 is splined at its one axial end in the direction of the axis C1, to the differential casing 23c of the front-wheel differential mechanism 23. The input rotary member 40 has external teeth 48 formed at its other axial end in the direction of the axis C1, and the external teeth 48 constitute a part of the first positive clutch 44.

The output rotary member 42 is a cylindrical member disposed radially outwardly of the input rotary member 40, and is rotatable about the axis C1 of the front-wheel axle 22R. The output rotary member 42 has a ring gear 46 which is formed at its one axial end in the direction of the axis C1 and which is held in meshing engagement with a driven pinion gear 26 connected to one end of the propeller shaft 28. The output rotary member 42 has external teeth 50 formed at its other axial end of the output rotary member 42 in the direction of the axis C1, and the external teeth 50 constitute another part of the first positive clutch 44.

The first positive clutch 44 is a connecting/disconnecting device for selectively connecting and disconnecting the input rotary member 40 and the output rotary member 42 to and from each other. The first positive clutch 44 includes: the external teeth 48 formed integrally with the input rotary member 40; the external teeth 50 formed integrally with the output rotary member 42; a cylindrical sleeve 52 having internal teeth 58 which are held in meshing engagement with the external teeth 48 and which are engageable also with the external teeth 50 as a result of a movement of the cylindrical sleeve 52 in the direction of the axis C1; and a clutch actuator 54 provided to generate a thrust force for moving the sleeve 52 in the direction of the axis C1. The clutch actuator 54 is an electrically controllable actuator incorporating a solenoid coil. The first positive clutch 44 is also provided with a synchronizing mechanism (not shown) for synchronizing rotary motions of the input and output rotary members 40 and 42 upon meshing engagement of the internal teeth 58 with the external teeth 50. It is noted that FIG. 1 shows the first positive clutch 44 placed in the released state. When the sleeve 52 is moved in the direction of the axis C1 toward the left front wheel 14L (i.e., in the leftward direction as seen in FIG. 1), the first positive clutch 44 which has been placed in the released state is brought into the engaged state in which the external teeth 50 and the internal teeth 58 mesh with each other, so that the input and output rotary members 40 and 42 are operatively connected to each other in a power-transmittable manner.

The rear-wheel drive force distributing unit 34 is disposed in a power transmitting path between the propeller shaft 28 and the left and right rear wheels 16L and 16R, and functions to distribute the drive force received from the propeller shaft 28 to the left and right rear wheels 16 and also to connect and disconnect the propeller shaft 28 and an output shaft 70 (described below) to and from each other. The rear-wheel drive force distributing unit 34 includes a second positive clutch 62 for selectively connecting and disconnecting the propeller shaft 28 and the output shaft 70 to and from each other, and a left coupling 64L and a right coupling 64R in the form of electronically controlled couplings for controlling torques to be transmitted between the output shaft 70 and the respective left and right rear wheels 16L and 16R. The left coupling 64L is disposed between the output shaft 70 and a left rear-wheel axle 36L, while the right coupling 64R is disposed between the output shaft 70 and a right rear-wheel axle 36R. A proportion of the torques to be transmitted to the left and right rear wheels 16 is adjusted by controlling torque capacities of the left and right couplings 64L and 64R.

The rear-wheel drive force distributing unit 34 receives a drive force from a drive pinion shaft 32 connected to the propeller shaft 28. The drive force transmitted to the drive pinion shaft 32 is distributed to the left and right rear-wheel axles 36L and 36R connected to the respective left and right rear wheels 16L and 16R, through a drive pinion gear 30 formed at an axial end portion of the drive pinion shaft 32, and a ring gear 68 meshing with the drive pinion gear 30. The ring gear 68 is constituted by a bevel gear in the form of a hypoid gear, for example.

The second positive clutch 62 is provided to selectively connect and disconnect the ring gear 68 and the output shaft 70 to and from each other. The second positive clutch 62 includes: a cylindrical portion 100 (described below) connected to the ring gear 68 and having internal teeth 66 formed at a radially inner portion of the cylindrical portion 100; a connecting/disconnecting sleeve 112 (described below and shown in FIG. 2) splined to the output shaft 70 and having external teeth 78 engageable with the internal teeth 66; and a switching mechanism 116 configured to move the connecting/disconnecting sleeve 112 in an axial direction of the output shaft 70, to selectively place the second positive clutch 62 in an engaged state in which the external teeth 78 and the internal teeth 66 are held in meshing engagement with each other, and in a released state in which the external teeth 78 and the internal teeth 66 are not held in meshing engagement with each other.

In a 2-wheel-drive state of the 4-wheel-drive vehicle 10 constructed as described above, the first positive clutch 44 and the second positive clutch 62 are both placed in the released states, so that the transfer 24 and the propeller shaft 28 are disconnected from each other, while the propeller shaft 28 and the output shaft 70 are disconnected from each other. In this 2-wheel-drive state, no rotary motion is transmitted to the propeller shaft 28, so that the propeller shaft 28 is held stationary. Accordingly, the propeller shaft 28 is prevented from being rotated with the rear wheels 16 in the 2-wheel-drive state and thus, deterioration of fuel economy of the vehicle 10 is reduced. In a 4-wheel-drive state of the vehicle 10, the first positive clutch 44 and the second positive clutch 62 are both placed in the engaged states, so that a portion of the drive force of the engine 12 is transmitted to the rear-wheel drive force distributing unit 34 through the transfer 24 and the propeller shaft 28, and is suitably distributed to the left and right rear wheels 16 according to the torque capacities of the left and right couplings 64L and 64R.

Figure 2:
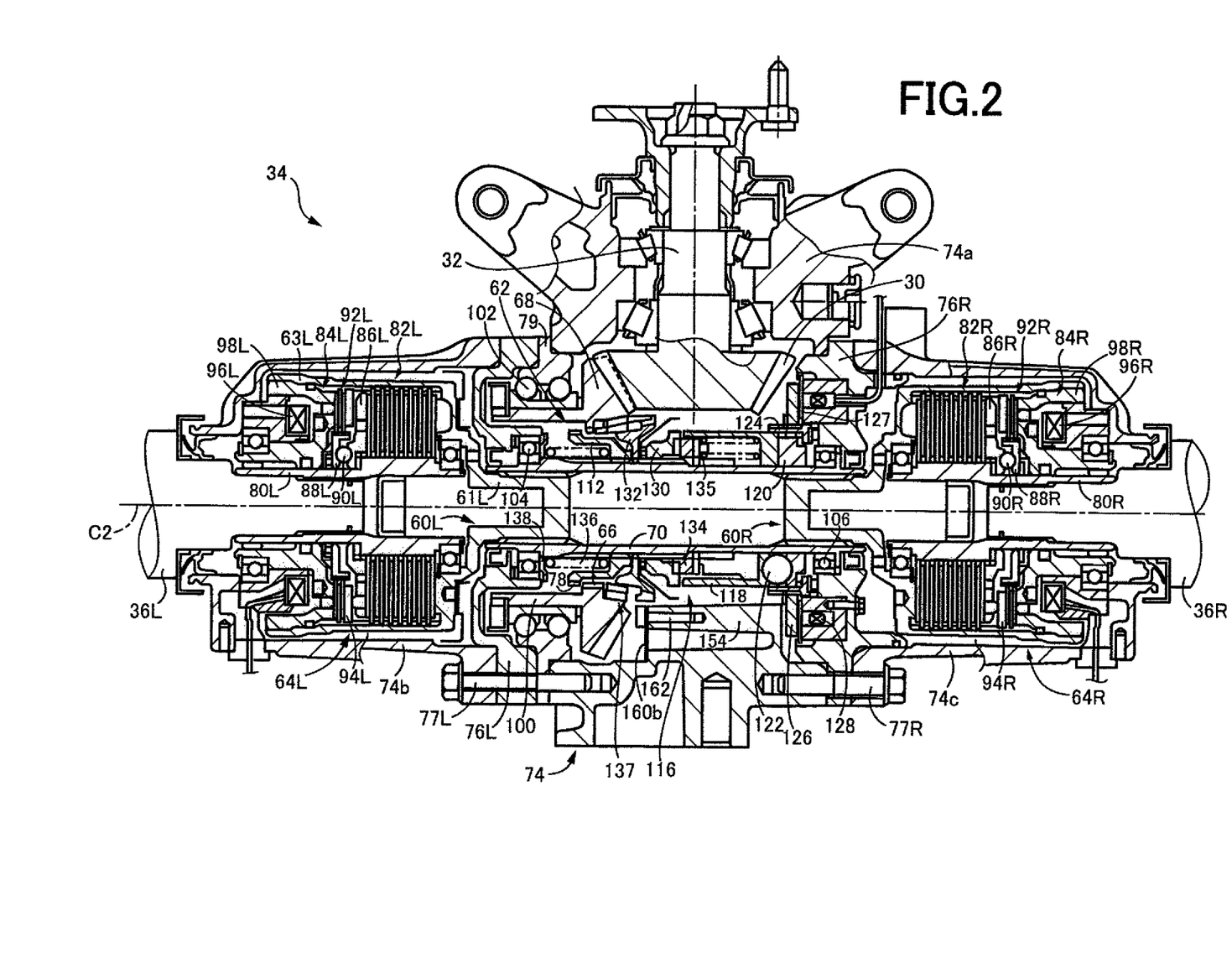
FIG. 2 is a cross sectional view of a rear-wheel drive force distributing unit shown in FIG. 1.

Reference is now made to FIG. 2, which is the cross sectional view of the rear-wheel drive force distributing unit 34 shown in FIG. 1. As shown in FIG. 2, the rear-wheel drive force distributing unit 34 is disposed within a housing 74 and concentrically with an axis C2. The rear-wheel drive force distributing unit 34 includes: the housing 74 storing an oil in its bottom portion; the drive pinion shaft 32 having the drive pinion gear 30 and rotatably supported by the housing 74, so as to receive the drive force from the engine 12; the ring gear 68 disposed within the housing 74, so as to be rotatable about the axis C2 and meshing with the drive pinion gear 30; the second positive clutch 62 disposed between the ring gear 68 and the output shaft 70; the left coupling 64L disposed between the output shaft 70 and the left rear-wheel axle 36L; and the right coupling 64R disposed between the output shaft 70 and the right rear-wheel axle 36R. It is noted that the rear-wheel drive force distributing unit 34 corresponds to the final speed reducing device of the present invention.

The housing 74 includes: a first housing portion 74a which rotatably supports the drive pinion shaft 32 having the drive pinion gear 30; a cylindrical second housing portion 74b principally accommodating the left coupling 64L; and a third housing portion 74c principally accommodating the right coupling 64R.

A partition wall 76L in the form of a disc is interposed between the first and second housing portions 74a and 74b in the direction of the axis C2, such that the partition wall 76L defines a space accommodating the left coupling 64L within the housing 74, and a space accommodating the ring gear 68 within the housing 74. Further, an outer ring 79 of a double-row angular ball bearing 102 (described below) is interposed between the first housing portion 74a and the partition wall 76L in the direction of the axis C2. The second housing portion 74b, the partition wall 76L and the outer ring 79 are fastened to the first housing portion 74a with bolts 77L, so as to constitute a unitary body. Thus, the partition wall 76L and the outer ring 79 also function as a part of a stationary member in the form of the housing 74. It is noted that the axis C2 is parallel to the axial directions of the rear-wheel axles 36 and the output shaft 70, and to the width or transverse direction of the vehicle 10.

A partition wall 76R in the form of a disc is interposed between the first housing portion 74a and the third housing portion 74c in the direction of the axis C2, such that the partition wall 76R defines a space accommodating the right coupling 64R within the housing 74, and a space accommodating the ring gear 68 within the housing 74. The third housing portion 74c and the partition wall 76R are fastened to the first housing portion 74a with bolts 77R, so as to constitute a unit. Thus, the partition wall 76R also functions as a part of the stationary member in the form of the housing 74.

The left coupling 64L will be described. The left coupling 64L includes: a clutch drum 60L splined to the output shaft 70; a clutch hub 80L splined to the left rear-wheel axle 36L; main frictional coupling elements 82L disposed between the clutch drum 60L and the clutch hub 80L; and a pressing mechanism 84L provided to press the main frictional coupling elements 82L against each other.

The clutch drum 60L is a stepped cylindrical member which is closed at one of its opposite axial ends and which is disposed rotatably about the axis C2. Described more specifically, the clutch drum 60L has a small-diameter portion 61L on the side of the closed axial end (on the side of the right rear-wheel axle 36R in the direction of the axis C2), and a large-diameter portion 63L on the side of the open axial end (on the side of the left rear-wheel axle 36L in the direction of the axis C2). The large-diameter portion 63L has a larger diameter than the small-diameter portion 61L. The small-diameter portion 61L is disposed radially inwardly of the output shaft 70, and is splined on an outer circumferential surface of the small-diameter portion 61L to an inner circumferential surface of the output shaft 70. Accordingly, the clutch drum 60L and the output shaft 70 are rotated about the axis C2 together with each other as a unit. The large-diameter portion 63L is disposed so as to accommodate therein the main frictional coupling elements 82L and the pressing mechanism 84L.

The clutch hub 80L is a cylindrical member disposed rotatably about the axis C2, and is splined on an inner circumferential surface of the clutch hub 80L to the left rear-wheel axle 36L, so that the clutch hub 80L and the left rear-wheel axle 36L are rotated together with each other as a unit.

The main frictional coupling elements 82L and the pressing mechanism 84L are accommodated within a space formed between the large-diameter portion 63L of the clutch drum 60L and the clutch hub 80L. The main frictional coupling elements 82L consist of a plurality of outer friction plates splined to an inner circumferential surface of the large-diameter portion 63L, and a plurality of inner friction plates splined to an outer circumferential surface of the clutch hub 80L. The outer friction plates and the inner friction plates are alternately disposed adjacent to each other.

The pressing mechanism 84L includes: a first cam member 86L functioning as a piston for pressing the main frictional coupling elements 82L against each other; a second cam member 88L; a plurality of balls 90L interposed between the first cam member 86L and the second cam member 88L; auxiliary frictional coupling elements 92L disposed radially outwardly of the second cam member 88L; an armature 94L, a solenoid coil 96L and a casing 98L which are disposed adjacent to the auxiliary frictional coupling elements 92L in the direction of the axis C2.

The first cam member 86L is an annular member which is splined at its radially inner portion to the clutch hub 80L, and a radially outer portion of which is positioned adjacent to the main frictional coupling elements 82L in the direction of the axis C2. The first cam member 86L has a plurality of ball retainer grooves formed in its surface facing the second cam member 88L in the direction of the axis C2. The balls 90L are partially accommodated in the ball retainer grooves.

The second cam member 88L is an annular member slidably fitted at its radially inner portion on the outer circumferential surface of the clutch hub 80L. The second cam member 88L has a plurality of ball retainer grooves formed in its surface facing the first cam member 86L in the direction of the axis C2. The balls 90L are partially accommodated in these ball retainer grooves. A radially inner friction plate of the auxiliary frictional coupling elements 92L is splined to an outer circumferential surface of the second cam member 88L.

The balls 90L are interposed and sandwiched between the ball retainer grooves formed in the first cam member 86L and the ball retainer grooves formed in the second cam member 88L, such that the balls 90L are partly held in contact with those ball retainer grooves. The ball retainer grooves are formed in the circumferential direction of the first and second cam members 86L and 88L, over a part of the circumference of each cam member 86L, 88L, such that the depth of each ball retainer groove decreases in the directions towards its opposite ends. When rotating speeds of the first and second cam members 86L and 88L have a difference, the balls 90L are moved toward one of the opposite ends of the ball retainer grooves, so that the first and second cam members 86L and 88L are moved by the balls 90L away from each other in the opposite directions of the axis C2. In this respect, it is noted that the movement of the second cam member 88L in the direction of the axis C2 is restricted so that the first cam member 86L is actually moved in the direction away from the second cam member 88L.

The auxiliary frictional coupling elements 92L consist of the radially inner friction plate in the form of a disc splined to the outer circumferential surface of the second cam member 88L, and radially outer friction plates in the form of discs splined to the inner circumferential surface of the large-diameter portion 63L of the clutch drum 60L. These inner and outer friction plates are alternately disposed adjacent to each other.

The armature 94L takes the form of a disc which is disposed adjacent to the auxiliary frictional coupling elements 92L in the direction of the axis C2. The armature 94L is splined on its outer circumferential surface to the inner circumferential surface of the large-diameter portion 63L of the clutch drum 60L. The solenoid coil 96L is fixed to the casing 98L so that the solenoid coil 96L is rotated with the casing 98L.

In the left coupling 64L constructed as described above, the torque capacities of the auxiliary frictional coupling elements 92L and the main frictional coupling elements 82L are zero while the solenoid coil 96L is placed in a de-energized state without application of an electric current thereto. Accordingly, a drive force is not transmitted between the clutch drum 60L and the clutch hub 80L, so that the drive force of the engine 12 is not transmitted to the left rear wheel 16L.

When the solenoid coil 96L is energized with an electric current applied thereto, on the other hand, a magnetic flux is generated around the solenoid coil 96L, so that the armature 94L is attracted toward the auxiliary frictional coupling elements 92L, so that the armature 94L presses the auxiliary frictional coupling elements 92L against each other. Accordingly, the auxiliary frictional coupling elements 92L have a torque capacity, so that the front and rear wheels 14 and 16 have a difference between their rotating speeds, whereby the first and second cam members 86L and 88L have a difference between the rotating speeds thereof, and the balls 90L press the first cam member 86L toward the main frictional coupling elements 82L, so that the first cam member 86L is moved toward the main frictional coupling elements 82L, to press the main frictional coupling elements 82L against each other. As a result, the main frictional coupling elements 82L have a torque capacity, so that a drive force transmitted from the engine 12 to the clutch drum 60L is transmitted to the clutch hub 80L through the main frictional coupling elements 82L. As the amount of electric current applied to the solenoid coil 96L increases, a force of attraction of the armature 94L increases, so that a force of the first cam member 86L to press the main frictional coupling elements 82L against each other increases. Accordingly, the torque capacity of the main frictional coupling elements 82L and the drive force to be transmitted from the clutch drum 60L to the clutch hub 80L through the main frictional coupling elements 82L increase with an increase of the amount of electric current applied to the solenoid coil 96L.

Then, the right coupling 64R will be described. The right coupling 64R includes: the clutch drum GOR splined to the output shaft 70; a clutch hub 80R splined to the right rear-wheel axle 36R; main frictional coupling elements 82R disposed between the clutch drum GOR and the clutch hub 80R; and a pressing mechanism 84R provided to press the main frictional coupling elements 82R against each other. The construction and operation of the right coupling 64R which are basically identical with those of the left coupling 64L will not be described. It is noted that a first cam member 86R, a second cam member 88R, balls 90R, auxiliary frictional coupling elements 92R, an armature 94R, a solenoid coil 96R and a casing 98R, which are also shown in FIG. 2 respectively correspond to the first cam member 86L, second cam member 88L, balls 90L, auxiliary frictional coupling elements 92L, armature 94L, solenoid coil 96L and casing 98L of the left coupling 64L.

The second positive clutch 62 is a connecting/disconnecting clutch for selectively connecting and disconnecting the ring gear 68 meshing with the drive pinion gear 30, and the output shaft 70 splined to the clutch drums 60L and 60R, to and from each other. The ring gear 68 has the cylindrical portion 100 extending in the direction of the axis C2, and is supported by the double-row angular ball bearing 102 at the cylindrical portion 100, rotatably about the axis C2. The output shaft 70 is a cylindrical member supported by the left and right partition walls 76L and 76R (by the housing 74) at opposite axial end portions of the output shaft 70 via respective side bearings 104 and 106, rotatably about the axis C2.

The second positive clutch 62 is placed in the engaged state when the connecting/disconnecting sleeve 112 is located in a connecting position in which the internal teeth 66 of the cylindrical portion 100 are held in meshing engagement with the external teeth 78 of the connecting/disconnecting sleeve 112, and is placed in the released state when the connecting/disconnecting sleeve 112 is located in a disconnecting position in which the internal teeth 66 are not held in meshing engagement with the external teeth 78. It is noted that FIG. 2 shows the connecting/disconnecting sleeve 112 placed in the disconnecting position.

The switching mechanism 116 includes: a first cam member 118 disposed such that the first cam member 118 is rotated with the output shaft 70 and is movable relative to the output shaft 70 in the direction of the axis C2; a second cam member 120 disposed so as to be opposed to the first cam member 118 in the direction of the axis C2; a plurality of balls 122 interposed between the first and second cam members 118 and 120; an annular member 124 which is L-shaped in an axial cross section and which is disposed radially outwardly of the second cam member 120 and fitted at an inner circumferential surface of the annular member 124 on the second cam member 120 such that the annular member 124 is rotated with the second cam member 120; a movable member 126 in the form of a disc splined on its inner circumferential surface to an outer circumferential surface of the annular member 124; a friction plate 127 having a disc shape and disposed adjacent to the movable member 126 in the direction of the axis C2 and splined on its outer circumferential surface to the partition wall 76R (housing 74); a solenoid coil 128 disposed adjacent to the friction plate 127, and on one side of the friction plate 127 remote from the movable member 126, in the direction of the axis C2; a piston 130 movable by the first cam member 118 in the direction of the axis C2; a synchronizer ring 132 held in abutting contact with the piston 130 via a thrust bearing and splined on its inner circumferential surface to the output shaft 70; a holder 134 disposed between the piston 130 and the first cam member 118; a spring 135 interposed between the holder 134 and the first cam member 118 and biasing the first cam member 118 toward the second cam member 120 in the direction of the axis C2; a spring 136 interposed between the side bearing 104 and the connecting/disconnecting sleeve 112 and biasing the connecting/disconnecting sleeve 112 in the direction of the axis C2 toward the second cam member 120; and a synchronizing mechanism 137 disposed between the synchronizer ring 132 and the ring gear 68.

The first cam member 118 is a cylindrical member which is splined on its inner circumferential surface to the output shaft 70 such that the first cam member 118 is rotated with the output shaft 70 and is movable relative to the output shaft 70 in the direction of the axis C2. The first cam member 118 has ball retainer grooves formed in its surface on the side of the second cam member 120 in the direction of the axis C2. The balls 122 are partially accommodated in the ball retainer grooves. The first cam member 118 has a cylindrical portion on its axial side remote from the second cam member 120 in the direction of the axis C2. This cylindrical portion extends in the direction of the axis C2, and comes into pressing contact at its axial end with the piston 130 when the first cam member 118 is moved in the direction of the axis C2 away from the second cam member 120.

The second cam member 120 is an annular member which is slidably fitted on its inner circumferential surface on an outer circumferential surface of the output shaft 70. The second cam member 120 has spline teeth splined on its outer circumferential surface to the annular member 124. The second cam member 120 has ball retainer grooves formed in its surface on the side of the first cam member 118 in the direction of the axis C2. The balls 122 are partially accommodated in the ball retainer grooves.

The plurality of balls 122 are interposed and sandwiched between the first and second cam members 118 and 120. Described more specifically, the balls 122 are held in contact with the ball retainer grooves formed in the first and second cam members 118 and 120. These ball retainer grooves are formed in the circumferential direction of the first and second cam members 118 and 120, over a part of the circumference of each cam member 118, 120, such that the depth of each ball retainer groove decreases in the directions towards its opposite ends. When the first and second cam members 118 and 120 are rotated relative to each other, the balls 122 are moved toward one of the opposite ends of the ball retainer grooves, so that the first and second cam members 118 and 120 are moved by the balls 122 away from each other in the opposite directions of the axis C2. In this respect, it is noted that the movement of the second cam member 120 in the direction of the axis C2 is restricted so that the first cam member 118 is actually moved in the direction away from the second cam member 120.

The annular member 124 is an annular member which is L-shaped in an axial cross section, and which is splined on the inner circumferential surface thereof to the second cam member 120 so that the annular member 124 is rotated together with the second cam member 120. The movable member 126 takes the form of a disc which is splined on its inner circumferential surface to the outer circumferential surface of the annular member 124 so that the movable member 126 is rotated together with the annular member 124 and is axially movable relative to the annular member 124 in the direction of the axis C2. The friction plate 127 is disposed between the movable member 126 and the solenoid coil 128 in the direction of the axis C2, and is splined on the outer circumferential surface thereof to the partition wall 76R (housing 74) so that the friction plate 127 is held stationary while the friction plate 127 is movable in the direction of the axis C2.

The solenoid coil 128 is disposed adjacent to the friction plate 127 in the direction of the axis C2, and is fixed to the partition wall 76R (housing 74) so that the solenoid coil 128 is not rotatable. When the solenoid coil 128 is energized with an electric current applied thereto, magnetic flux is generated and the movable member 126 is attracted toward the solenoid coil 128. As a result, a frictional force is generated between the movable member 126 and the friction plate 127, so that rotating speeds of the movable member 126, annular member 124 and second cam member 120 are reduced or zeroed.

The piston 130 is an annular member slidably fitted on its inner circumferential surface on the output shaft 70. The piston 130 has a tooth formed on its end face opposed to the holder 134 in the direction of the axis C2, such that this tooth is engageable with teeth formed on the holder 134 as described below. The piston 130 is pressed by the cylindrical portion of the first cam member 118 so that the piston 130 is moved in the direction of the axis C2.

The synchronizer ring 132 is an annular member splined on its inner circumferential surface to the output shaft 70 so that the synchronizer ring 132 is rotated together with the output shaft 70 and is movable relative to the output shaft 70 in the direction of the axis C2. The synchronizer ring 132 has a tapered outer circumferential surface which slidably contacts a second friction member (described below) of the synchronizing mechanism 137.

The synchronizing mechanism 137 which functions to synchronize rotating speeds of the ring gear 68 and the output shaft 70 is disposed between the synchronizer ring 132 and the ring gear 68. The synchronizing mechanism 137 includes a first friction member having a tapered outer circumferential surface which is held in engagement with the synchronizer ring 132 for rotation together with the synchronizer ring 132 and which slidably contacts an inner circumferential surface of the ring gear 68. The synchronizing mechanism 137 further includes the above-indicated second friction member which is held in engagement with the ring gear 68 for rotation together with the ring gear 68 and which slidably contacts the tapered outer circumferential surface of the synchronizer ring 132. These first and second friction members slidably contact each other. When the piston 130 presses the synchronizer ring 132, there arise frictional forces among a contact surface of the second friction member contacting the synchronizer ring 132, a contact surface of the first friction member contacting the ring gear 68, and contact surfaces of the first and second friction members contacting each other. These frictional forces permit synchronization of the rotating speeds of the ring gear 68 and the output shaft 70.

The holder 134 is an annular member which is fixed on its outer circumferential surface to the output shaft 70 such that the holder 134 is rotated together with the output shaft 70 and is moved together with the output shaft 70 in the direction of the axis C2. The holder 134 has the above-indicated teeth formed on its end face opposed to the piston 130 in the direction of the axis C2, such that these teeth are engageable with the above-indicated tooth of the piston 130. The teeth of the holder 134 are saw-teeth formed differently at intervals in its circumferential direction. Namely, the saw-teeth of the holder 134 consist of first and second teeth formed alternately in its circumferential direction so that the first and second teeth engage the tooth of the piston 130 to thereby hold the piston 130 at different positions in the direction of the axis C2.

When one of the first teeth is held in engagement with the tooth of the piston 130, the piston 130 (connecting/disconnecting sleeve 112) is held at its axial position in which the external teeth 78 of the connecting/disconnecting sleeve 112 and the internal teeth 66 of the ring gear 68 are not held in engagement with each other. When one of the second teeth is held in engagement with the tooth of the piston 130, on the other hand, the piston 130 (connecting/disconnecting sleeve 112) is held at its axial position in which the external teeth 78 of the connecting/disconnecting sleeve 112 and the internal teeth 66 of the ring gear 68 are held in engagement with each other. The tooth of the piston 130 and the teeth of the holder 134 have surfaces inclined in the circumferential direction so that the movement of the piston 130 by the first cam member 118 toward the side bearing 104 in the direction of the axis C2 causes releasing of the engagement of the tooth of the piston 130 with one of the first and second teeth of the holder 134, and subsequent movement of the piston 130 away from the side bearing 104 in the direction of the axis C2 causes engagement of the tooth of the piston 130 with the other of the first and second teeth of the holder 134. Detailed description of geometric features of the inclined surfaces of the teeth of the piston 130 and the holder 134 is omitted since the geometric features are known in the art.

The spring 136 is interposed between an inner race of the side bearing 104 and the connecting/disconnecting sleeve 112 in the direction of the axis C2, and biases the connecting/disconnecting sleeve 112, the synchronizer ring 132 and the piston 130 toward the side bearing 106 in the direction of the axis C2. Accordingly, the tooth of the piston 130 is held in engagement with one of the first and second teeth of the holder 134 with a biasing force of the spring 136 while the piston 130 is not pressed and moved by the first cam member 118 toward the side bearing 104 in the direction of the axis C2.

An operation of the switching mechanism 116 will then be described. In the switching mechanism 116 constructed as described above, application of an electric current to the solenoid coil 128 causes generation of a magnetic flux, and attraction of the movable member 126 toward the solenoid coil 128. Accordingly, a frictional force is generated between the movable member 126 and the friction plate 127, so that the rotating speeds of the movable member 126, annular member 124 and second cam member 120 are reduced or zeroed. As a result, there arises a difference between the rotating speeds of the first cam member 118 and the second cam member 120, so that the first cam member 118 is pressed and moved by the balls 122 in the direction of the axis C2, and the piston 130 in abutting contact with the first cam member 118 is moved toward the side bearing 104 in the direction of the axis C2, against the biasing force of the spring 136.

The movement of the piston 130 toward the side bearing 104 in the direction of the axis C2 causes movements of the synchronizer ring 132 and the connecting/disconnecting sleeve 112 toward the side bearing 104 in the direction of the axis C2 in synchronization with the movement of the piston 130. In the process of the movement of the synchronizer ring 132, a frictional force is generated in the synchronizing mechanism 137, so that the rotating speeds of the ring gear 68, the output shaft 70 and the connecting/disconnecting sleeve 112 are synchronized with each other, with the generated frictional force. At this time, the internal teeth 66 of the ring gear 68 and the external teeth 78 of the connecting/disconnecting sleeve 112 are engageable with each other. When the solenoid coil 128 is placed in the de-energized state, the pressing force is not generated by the first cam member 118, so that the connecting/disconnecting sleeve 112, the synchronizer ring 132 and the piston 130 are moved with the biasing force of the spring 136 toward the side bearing 106 in the direction of the axis C2, and the tooth of the piston 130 is brought into engagement with the second tooth of the holder 134, for example, so that the external teeth 78 of the connecting/disconnecting sleeve 112 and the internal teeth 66 of the ring gear 68 are brought into engagement with each other. Accordingly, the second positive clutch 62 is brought into the engaged state, so that the ring gear 68 and the output shaft 70 are rotated together with each other as a unit.

When the solenoid coil 128 is energized with application of an electric current thereto while the second positive clutch 62 is placed in the engaged state, the piston 130 is moved toward the side bearing 104 in the direction of the axis C2, and the engagement of the tooth of the piston 130 with the second tooth of the holder 134 is released. When the solenoid coil 128 is de-energized, the piston 130 is moved with the biasing force of the spring 136 toward the side bearing 106 in the direction of the axis C2, and the tooth of the piston 130 is brought into engagement with the first tooth of the holder 134, so that the external teeth 78 of the connecting/disconnecting sleeve 112 are brought into engagement with the internal teeth 66 of the ring gear 68. Accordingly, the second positive clutch 62 is brought into the released state. Thus, each time the solenoid coil 128 is energized and de-energized, the tooth of the piston 130 is alternately brought into engagement with one and the other of the first and second teeth of the holder 134, so that the second positive clutch 62 is alternately brought into the engaged and released states.

Figure 3:
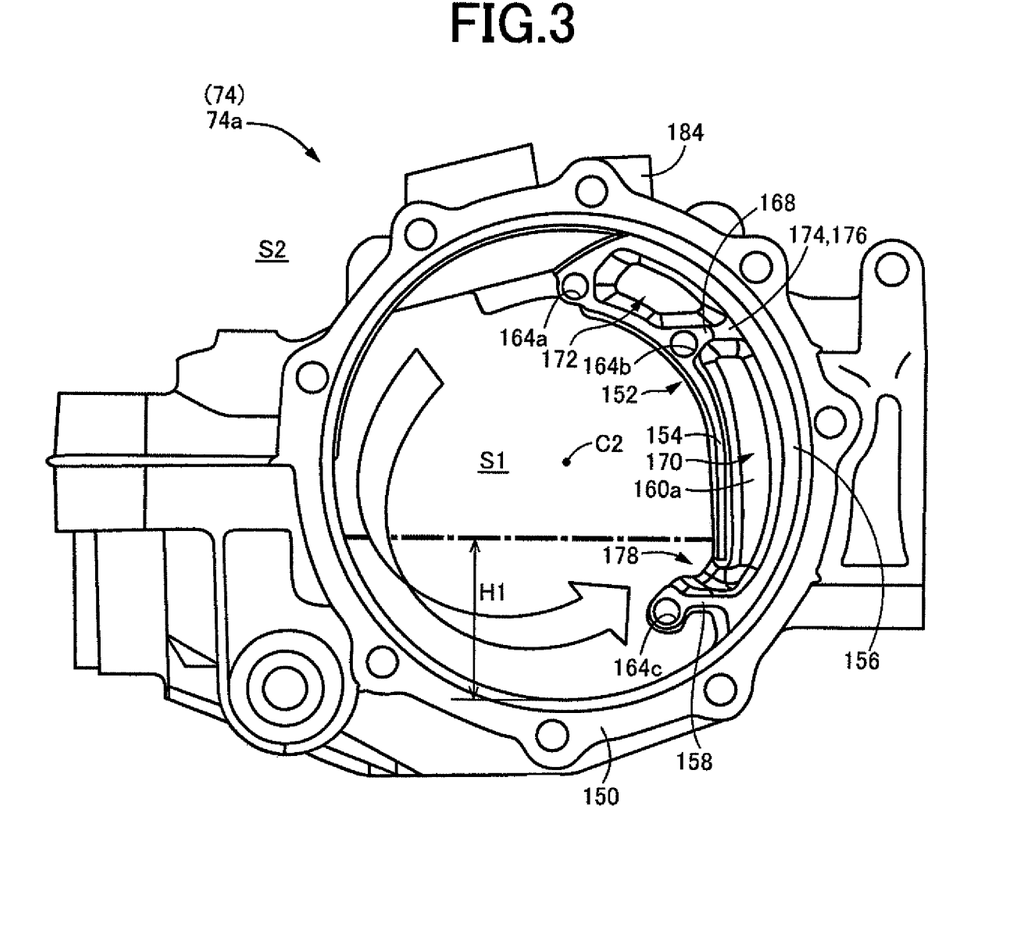
FIG. 3 is a view of a housing of the rear-wheel drive force distributing unit of FIG. 2.
Figure 4:
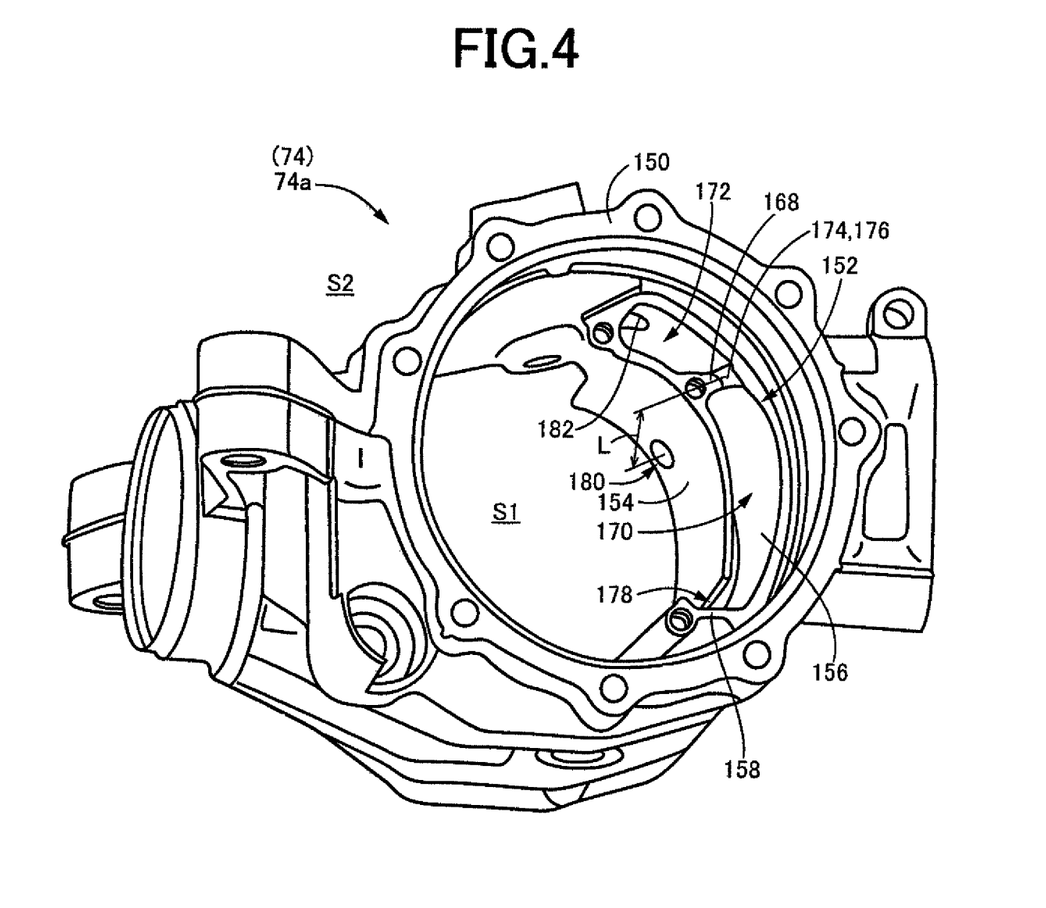
FIG. 4 is a perspective view of the housing of FIG. 3 as seen in a rightward and upward direction.

FIGS. 3 and 4 are the views showing the structure of the first housing portion 74a of the housing 74 of the rear-wheel drive force distributing unit 34 shown in FIG. 2. FIG. 3 is the view of the first housing portion 74a as seen in the direction from the left rear wheel 16L toward the right rear wheel 16R, while FIG. 4 is the perspective view of the housing 74 of FIG. 3 as seen in a rightward and upward direction. The left-hand and right-hand sides as seen in FIG. 3 respectively correspond to the forward and rearward directions of the vehicle 10, while the upward and downward directions as seen in FIG. 3 respectively correspond to the upward and downward directions of the vehicle 10 staying on a level roadway surface. One-dot chain line in FIG. 3 indicates a level H1 of the oil stored in the bottom portion of the housing 74 from the lowest point in an interior space within the housing 74, when the ring gear 68 is held at rest.

As shown in FIG. 3, the first housing portion 74a is a cylindrical member which is open at its opposite axial ends as seen in the direction of the axis C2. The first housing portion 74a has an axial end face 150 at one of the opposite axial ends, at which the second housing portion 74b, the partition wall 76L and the outer ring 79 shown in FIG. 2 are fastened to the first housing portion 74a with the bolts 77L, such that the first and second housing portions 74a and 74b, the partition wall 76L and the outer ring 79 constitute a unitary body.

The first housing portion 74a has a breather chamber 152 formed in a rear part of the first housing portion 74a as seen in the longitudinal direction of the vehicle 10. The breather chamber 152 is an air passage for communication between the interior space within the housing 74 and the outside atmosphere. When a pressure within the interior space within the housing 74 is raised, air is discharged from the interior space into the outside atmosphere through the breather chamber 152. Accordingly, the breather chamber 152 prevents an excessive rise of the air pressure within the housing 74.

The first housing portion 74a includes: an intermediate wall 154 dividing an interior space of the first housing portion 74a into front and rear parts; a rear wall 156 located in the rear part; a bottom wall 158 extending from the rear wall 156 to a position below the intermediate wall 154; and a pair of side walls 160a and 160b (shown in FIG. 5) which are opposed to each other in the direction of the axis C2 and are connected to the intermediate, rear and bottom walls 154, 156 and 158. The breather chamber 152 is defined by those intermediate, rear, bottom and side walls 154, 156, 158, 160a and 160b.

The rear wall 156 is formed along a part of a circumference of a generally cylindrical outer wall of the first housing portion 74a, and has a lower end located below a lower end of the intermediate wall 154.

The rear wall 156 has an upper end portion connected to the intermediate wall 154. The intermediate wall 154, which has a suitable thickness, is formed on a front side of the rear wall 156, so as to extend downwardly from an upper end portion of the intermediate wall 154 connected to the rear wall 156, such that a suitable amount of gap is left between the intermediate wall 154 and the rear wall 156. The intermediate wall 154 has a downwardly and linearly extending lower end portion, and two tapped holes 164a and 164b for screw-fixing the side wall 160b (shown in FIG. 5).

The bottom wall 158 extends from the rear wall 156 forwardly and under the intermediate wall 154, such that a front end of the bottom wall 158 is located forwardly of the lower end of the intermediate wall 154 and an opening 178 (described below) formed in a lower portion of the breather chamber 152. The bottom ball 158 has a tapped hole 164c at a distal portion for screw-fixing the side wall 160b.

The two side walls 160a and 160b are located on the respective opposite sides of the intermediate, rear and bottom walls 154, 156 and 158 as seen in the direction of the axis C2, and are connected to respective opposite side end faces of those walls 154, 156 and 158 as seen in the direction of the axis C2, so as to cover the side end faces. The side wall 160a is located on one of opposite sides of the first housing portion 74a, which is remote from the axial end face 150, as seen in the direction of the axis C2, that is, on the side not shown in FIG. 3. This side wall 160a is formed integrally with the intermediate, rear and bottom walls 154, 156 and 158 during casting of the first housing portion 74a.

Figure 5:
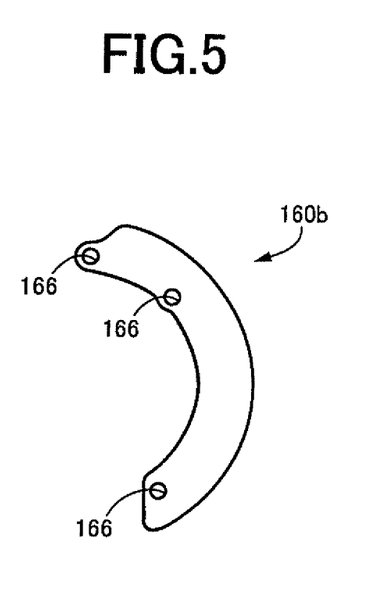
FIG. 5 is a view illustrating a shape of one of a pair of side walls of the housing.

On the other hand, the side wall 160b is located on the side of the first housing portion 74a nearer to the axial end face 150 as seen in the direction of the axis C2, and is screwed to the intermediate, rear and bottom walls 154, 156 and 158 during assembling of the rear-wheel drive force distributing unit 34. FIG. 5 shows the shape of the side wall 160b. The side wall 160b is a thin plate which covers the side end faces of the intermediate, rear and bottom walls 154, 156 and 158, and which has an arcuate shape i.e. the shape following the shapes of the side end faces. The side wall 160b has three through-holes 166 through which screws 162 (shown in FIG. 2) are inserted during assembling of the rear-wheel drive force distributing unit 34. The three through-holes 166 provided to fix the side wall 160b are formed at positions corresponding to those of the screw holes 164a, 164b and 164c. To fix the side wall 160b to the intermediate, rear and bottom walls 154, 156 and 158, the screws 162 inserted through the through-holes 166 are screwed into the tapped holes 164a, 164b and 164c, so that the side wall 160b is held in abutting contact with the side end faces of the intermediate, rear and bottom walls 154, 156 and 158. As described above, the first housing portion 74a has the axial end face 150 as seen in the direction of the axis C2, and the second housing portion 74b, the partition wall 76L and the outer ring 79 are fixed to the axial end face 150 with the bolts 77L. Thus, the side walls 160a and 160b are held in abutting contact with the opposite side end faces of each of the intermediate, rear and bottom walls 154, 156 and 158, so that the interior space within the housing 74 is divided into the breather chamber 152, and an outside space S1 outside the breather chamber 152.

Between the intermediate wall 154 and the rear wall 156, there is formed a partition wall 168 connecting these intermediate and rear walls 154 and 156. This partition wall 168 has the same dimension as the intermediate wall 154 in the direction of the axis C2. The partition wall 168 is located above the axis C2 in a vertical direction of the vehicle 10. In the presence of the partition wall 168, the breather chamber 152 is divided into an auxiliary breather chamber 170 and a primary breather chamber 172. The auxiliary breather chamber 170 is located rearwards of an axis of the ring gear 68 (the axis C2), while the primary breather chamber 172 is located upwards of the auxiliary breather chamber 170 and the axis C2 of the ring gear 68.

The partition wall 168 has a recess 174 formed in one of its opposite side end faces which is on the side of the axial end face 150 in the direction of the axis C2. In the presence of this recess 174, there is formed a communication hole 176 between the partition wall 168 and the side wall 160b, for communication between the auxiliary breather chamber 170 and the primary breather chamber 172, after the side wall 160b is held in abutting contact with the side end faces of the intermediate, rear and bottom walls 154, 156 and 158. Thus, the recess 174 partially defines the communication hole 176, which functions as a second hole of the present invention.

Below the auxiliary breather chamber 170, there is formed the above-indicated opening 178 for communication between the auxiliary breather chamber 170 and the outside space S1 formed outside the breather chamber 152 and within the housing 74. The opening 178 is a gap formed between the lower end of the intermediate wall 154 and the bottom wall 158. The auxiliary breather chamber 170 is held in communication with the outside space S1 through the opening 178. Further, as described in FIG. 4, the intermediate wall 154 has a through-hole 180 formed therethrough for communication between the outside space S1 and the auxiliary breather chamber 170. This through-hole 180 functions as a first hole of the present invention.

The through-hole 180 is held in communication with an upper portion of the auxiliary breather chamber 170. Described more specifically, the through-hole 180 is located above the level H1 of the oil stored in the bottom portion of the housing 74 while the ring gear 68 is held at rest. The ring gear 68 is partly immersed within a bath of the oil stored in the bottom portion of the housing 74. During rotation of the ring gear 68, the oil is splashed up, so that the level of the oil is lowered below the level H1 while the ring gear 68 is held at rest. Since the through-hole 180 is located above the level H1, the auxiliary breather chamber 170 is kept in communication with the outside space S1 through the through-hole 180, even while the ring gear 68 is held at rest. Further, the level H1 of the oil is higher than the position of the opening 178, in other words, the position of the opening 178 is lower than the level H1, while the ring gear 68 is held at rest. That is, the opening 178 is kept within the bath of the oil while the ring gear 68 is held at rest. Accordingly, the outside space S1 formed outside the breather chamber 152 and within the housing 74 is not in communication with the auxiliary breather chamber 170 through the opening 178.

Further, the through-hole 180 is formed at a position spaced apart from a position of the communication hole 176 formed through the partition wall 168, by a predetermined distance L in the direction of the axis C2 (in the axial direction of the rear-wheel axles 36). Described in detail, the through-hole 180 has the predetermined distance L to the communication hole 176 formed on the side of the side wall 160b, in the direction of the axis C2 toward the side wall 160a.

The primary breather chamber 172 is provided at its upper part with an externally communicating hole 182, as shown in FIG. 4. The externally communicating hole 182 is held in communication with the outside atmosphere outside the housing 74, through a boss 184 (shown in FIG. 3) of a breather plug (not shown). Since the primary breather chamber 172 is held in communication with the outside atmosphere through the externally communicating hole 182, the air can be discharged from the primary breather chamber 172 into the outside atmosphere through the externally communicating hole 182 and the breather plug. Further, the primary breather chamber 172 is held in communication with the auxiliary breather chamber 170 through the communication hole 176 formed through the partition wall 168.

The operation and advantages of the breather chamber 152 having the structure described above will be described. While the ring gear 68 is held at rest, the oil stored in the bottom portion of the housing 74 is not splashed up by the ring gear 68, so that the level H1 of the oil stored in the bottom portion of the housing 74 is comparatively high. Although the opening 178 of the auxiliary breather chamber 170 is kept within the bath of the oil, the auxiliary breather chamber 170 is held in communication with the outside space S1 outside the breather chamber 152 and within the housing 74, through the through-hole 180 formed through the intermediate wall 154. Accordingly, the interior space of the housing 74 is held in communication with the outside atmosphere (external space S2) outside the housing 74, through the through-hole 180 and the breather chamber 152, so that the air can be discharged from the housing 74 into the external space S2, even while the ring gear 68 is held at rest.

While the ring gear 68 is rotated (to drive the vehicle 10 in the forward direction), on the other hand, the oil stored in the bottom portion of the housing 74 is splashed up by the rotating ring gear 68, so that the level of the oil stored in the bottom portion of the housing 74 is lowered, whereby the oil containing the air flows into the auxiliary breather chamber 170. In this respect, it is noted that the opening 178 is located below the level H1 of the oil while the ring gear 68 is held at rest, and that a dimension of the auxiliary breather chamber 170 in the vertical direction is determined so that the air and the oil can be separated from each other until the air containing the oil reaches the primary breather chamber 172. Namely, the air which contains the oil and which has flown into the auxiliary breather chamber 170 through the opening 178 is separated from the oil within the auxiliary breather chamber 170 before the air reaches the primary breather chamber 172. The vertical dimension of the auxiliary breather chamber 170 is large enough to permit the opening 178 to be kept within the bath of the oil stored in the bottom portion of the housing 74 while the ring gear 68 is held at rest. However, the outside space S1 within the housing 74 and the auxiliary breather chamber 170 are held in communication with each other through the through-hole 180, and the air can be discharged from the housing 74 into the external space S2 outside the housing 74. In other words, the through-hole 180 permits the vertical dimension of the auxiliary breather chamber 170 to be large enough to permit the air to be separated from the oil within the auxiliary breather chamber 170.

In addition, the outside space S1 within the housing 74 is held in communication with the auxiliary breather chamber 170 through the through-hole 180 even while the ring gear 68 is rotated. The air which contains the oil and which has flown into the auxiliary breather chamber 170 through the through-hole 180 tend to flow into the primary breather chamber 172 through the communication hole 176. However, the air is separated from the oil until the air containing the oil reaches the communication hole 176, owing to the relatively long distance L of the through-hole 180 to the communication hole 176 in the direction of the axis C2. Accordingly, the risk of entry of the oil into the primary breather chamber 172 is reduced. It is noted that the distance L is determined by experimentation or theoretical analysis, such that the air which contains the oil and which has flown into the auxiliary breather chamber 170 through the through-hole 180 can be separated from the oil until the air reaches the communication hole 176.

Further, the ring gear 68 is accommodated within the outside space S1 formed outside the breather chamber 152 and within the housing 74, as shown in FIG. 2, and the oil stored in the bottom portion of the housing 74 is splashed up by the ring gear 68 rotating in a direction indicated by an arrow indicated in FIG. 3, to drive the vehicle 10 in the forward direction. The rotation of the ring gear 68 in the direction indicated by the arrow causes the oil to flow upwards along an inner wall surface of the housing 74, and to tend to flow into the breather chamber 152 through the opening 178. However, the bottom wall 158 extends from the rear wall 156 such that the front end of the bottom wall 158 is located forwardly of the opening 178 in the longitudinal direction of the vehicle 10. Accordingly the oil splashed up by the ring gear 68 comes into collision with the bottom wall 158, a risk of entry of the oil into the auxiliary breather chamber 170 through the opening 178 is reduced. It is noted that a dimension of the bottom wall 158 in the longitudinal direction of the vehicle 10 is determined by experimentation or theoretical analysis, so as to reduce the risk of entry of the oil splashed up by the rotating ring gear 68, into the auxiliary breather chamber 170 through the opening 178.

The vehicular final speed reducing device in the form of the rear-wheel drive force distributing unit 34 according to the illustrated embodiment described above is configured such that the air within the housing 74 is allowed to flow into the primary breather chamber 172 through the auxiliary breather chamber 170. Although the air within the housing 74 may flow into the auxiliary breather chamber 170, together with the oil, the air and the oil are separated from each other within the auxiliary breather chamber 170. Further, the bottom wall 158 reduces a risk of flow of the oil splashed up by the rotating ring gear 68, into the auxiliary breather chamber 170 through the opening 178. Thus, the rear-wheel drive force distributing unit 34 is configured to reduce a risk of flow of the oil into the primary breather chamber 172 and a risk of leakage of the oil from the housing 74 into the outside atmosphere. In addition, the rear-wheel drive force distributing unit 34 has a simple structure wherein the breather chamber 152 is divided into the auxiliary and primary breather chambers 170 and 172.

The illustrated embodiment is further configured such that the through-hole 180 is formed at a position spaced apart from a position of the communication hole 176 formed through the partition wall 168, by the predetermined distance L in the direction of the axis C2 of the ring gear 68. Accordingly, the air which contains the oil and which has flown from the through-hole 180 into the auxiliary breather chamber 170 can be separated from the oil until the air reaches the communication hole 176, making it possible to reduce the risk of flow of the oil into the primary breather chamber 172 and the risk of leakage of the oil from the housing 74 into the outside atmosphere.

The illustrated embodiment is also configured such that the opening 178 is formed at the position below the level H1 of the oil while the ring gear 68 is held at rest. Accordingly, the outside space S1 formed outside the breather chamber 152 and within the housing 74 is not in communication with the auxiliary breather chamber 170 through the opening 178. On the other hand, the through-hole 180 is located above the level H1 of the oil while the ring gear 68 is held at rest, so that the outside space S1 and the auxiliary breather chamber 170 are held in communication with each other through the through-hole 180. Accordingly, the air can be discharged from the housing 74 into the outside atmosphere, even while the ring gear 68 is held at rest.

The illustrated embodiment is further configured such that the opening 178 is formed at a position lower than the level H1 of the oil while the ring gear 68 is held at rest. Accordingly, the primary breather chamber 172 has a relatively long distance to the opening 178. The level of the oil while the ring gear 68 is rotated is lowered with respect to the level H1 while the ring gear 68 is held at rest, so that the air containing the oil flows into the auxiliary breather chamber 170 through the opening 178. Since the primary breather chamber 172 is relatively distant from the opening 178, however, the air can be separated from the oil within the auxiliary breather chamber 170, whereby the risk of flow of the oil into the primary breather chamber 172 can be reduced.

Further, the illustrated embodiment is configured such that the intermediate wall 154, the rear wall 156, the bottom wall 158, the side wall 160a and the partition wall 168 are formed integrally with the housing 74, so that the rear-wheel drive force distributing unit 34 can be produced in a smaller number of process steps.

While the preferred embodiment has been described in detail by reference to the drawings, it is to be understood that the invention may be otherwise embodied.

In the illustrated embodiment, the rear-wheel drive force distributing unit 34 is the final speed reducing device not provided with a differential gear mechanism. However, the present invention is equally applicable to a final speed reducing device provided with a differential gear mechanism.

In the illustrated embodiment, the intermediate wall 154, the rear wall 156, the bottom wall 158 and the side wall 160a are formed by casting, integrally with the first housing portion 74a. However, at least one of these walls 154, 156, 158 and 160a may be formed as a member which is separate from the first housing portion 74a and fixed to the first housing portion 74a with screws or any other fixing means, upon assembling of the rear-wheel drive force distributing unit 34.

In the illustrated embodiment, the communication hole 176 is the recess 174 formed in the partition wall 168. However, the communication hole 176 may be formed through the partition wall 168, by drilling, for instance.

While the preferred embodiment of the invention and its modifications have been described by reference to the drawings, for illustrative purpose only, it is to be understood that the present invention may be embodied with various other changes and improvements which may occur to those skilled in the art.

NOMENCLATURE OF ELEMENTS

12: engine (drive power source)
16: rear right and left wheels
30: drive pinion gear
32: drive pinion shaft
34: rear-wheel drive force distributing unit (vehicular final speed reducing device)
36: rear-wheel axles
68: ring gear
74: housing
150: axial end face
152: breather chamber
154: intermediate wall
156: rear wall
158: bottom wall
160a, 160b: pair of side walls
168: partition wall
170: auxiliary breather chamber
172: primary breather chamber
176: communication hole (second hole)
178: opening
180: through-hole (first hole)
182: externally communicating hole
184: boss

What is claimed is:

1. A final speed reducing device for a vehicle including a drive power source, rear right and left wheels, and a pair of rear-wheel axles respectively connected to the rear right and left wheels, the final speed reducing device comprising:
   a housing having a bottom portion storing an oil;
   a drive pinion shaft which includes a drive pinion gear and which is rotatably supported by the housing such that a vehicle drive force is transmitted to the drive pinion shaft from the drive power source; and
   a ring gear which is rotatably disposed within an interior space of the housing and which is held in meshing engagement with the drive pinion gear, so that the vehicle drive force transmitted to the drive pinion shaft is distributed to the pair of rear-wheel axles through the drive pinion gear and the ring gear,
   wherein the housing includes an intermediate wall dividing the interior space of the housing into front and rear parts, a rear wall located in a rear part of the housing, a bottom wall extending from the rear wall to a position below the intermediate wall, a pair of side walls opposed to each other and connected to the intermediate, rear and bottom walls, and a partition wall, the intermediate wall, the rear wall, the bottom wall, and the pair of side walls defining a breather chamber, the partition wall dividing the breather chamber into an auxiliary breather chamber positioned rearwards of an axis of the ring gear in a longitudinal direction of the vehicle, and a primary breather chamber positioned upwards of the auxiliary breather chamber, the auxiliary breather chamber being held in communication at an upper portion thereof with an outside space formed outside the breather chamber and within the housing, through a first hole formed through the intermediate wall, and through an opening formed between the intermediate wall and the bottom wall, the primary breather chamber being held in communication with an outside atmosphere outside the housing, and with the auxiliary breather chamber through a second hole formed through the partition wall, the bottom wall extending from the rear wall such that a front end of the bottom wall is located forwardly of the opening in the longitudinal direction of the vehicle.

2. The final speed reducing device according to claim 1, wherein the first hole is formed at a position spaced apart from a position of the second hole formed through the partition wall, by a predetermined distance in an axial direction of the rear-wheel axles.

3. The final speed reducing device according to claim 1, wherein the first hole is located above a level of the oil stored in the bottom portion of the housing while the ring gear is held at rest, and the opening is kept within a bath of the oil while the ring gear is held at rest.

4. The final speed reducing device according to claim 2, wherein the first hole is located above a level of the oil stored in the bottom portion of the housing while the ring gear is held at rest, and the opening is kept within a bath of the oil while the ring gear is held at rest.

5. The final speed reducing device according to claim 1, wherein the intermediate wall, the rear wall, the bottom wall, one of the pair of side walls, and the partition wall are formed integrally with the housing.

6. The final speed reducing device according to claim 2, wherein the intermediate wall, the rear wall, the bottom wall, one of the pair of side walls, and the partition wall are formed integrally with the housing.

7. The final speed reducing device according to claim 3, wherein the intermediate wall, the rear wall, the bottom wall, one of the pair of side walls, and the partition wall are formed integrally with the housing.

8. The final speed reducing device according to claim 4, wherein the intermediate wall, the rear wall, the bottom wall, one of the pair of side walls, and the partition wall are formed integrally with the housing.

* * * * *